(12) United States Patent
Harrison et al.

(10) Patent No.: US 10,577,022 B2
(45) Date of Patent: Mar. 3, 2020

(54) BODY STRUCTURE HAVING B-PILLAR REINFORCEMENTS FORMED INTEGRALLY AND AS CURVED TUBES, AND CORRESPONDINGLY FORMED B-PILLAR REINFORCEMENT

(71) Applicant: Bayerische Motoren Werke Aktiengesellschaft, Munich (DE)

(72) Inventors: Robert Harrison, Sankt Wolfgang (DE); Robert Loch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/667,957

(22) Filed: Aug. 3, 2017

(65) Prior Publication Data
US 2017/0327154 A1   Nov. 16, 2017

Related U.S. Application Data

(63) Continuation of application No. PCT/EP2016/056665, filed on Mar. 24, 2016.

(30) Foreign Application Priority Data
Mar. 25, 2015 (DE) .......................... 10 2015 205 402

(51) Int. Cl.
*B62D 25/04* (2006.01)
*B62D 21/15* (2006.01)
(Continued)

(52) U.S. Cl.
CPC ........... *B62D 25/04* (2013.01); *B62D 27/026* (2013.01); *B62D 29/007* (2013.01); *B62D 65/02* (2013.01); *B62D 21/157* (2013.01)

(58) Field of Classification Search
CPC ..... B62D 25/04; B62D 21/157; B62D 27/026; B62D 29/007
(Continued)

(56) References Cited

U.S. PATENT DOCUMENTS 5,716,155 A  * 2/1998 Yoshida ............... B62D 23/005
                                                              403/187
6,059,899 A     5/2000 Shibata et al.
(Continued)

FOREIGN PATENT DOCUMENTS

CN      201220692 Y    4/2009
CN      101522508 A    9/2009
(Continued)

OTHER PUBLICATIONS

International Search Report (PCT/ISA/210) issued in PCT Application No. PCT/EP2016/056665 dated Jun. 24, 2016 with English translation (Eight (8) pages).
(Continued)

Primary Examiner — Gregory A Blankenship
(74) Attorney, Agent, or Firm — Crowell & Moring LLP

(57) ABSTRACT

A body structure for a passenger car has B-pillar reinforcements of which each have an upper attachment section for attachment to the roof area and a lower attachment section for attachment to the floor assembly or to a side sill. The B-pillar reinforcements are formed as integral tubes made of high-strength steel material and, between the lower attachment sections of the tubes and the upper attachment sections thereof, have a curved course having a constant radius of curvature.

10 Claims, 1 Drawing Sheet

(51) Int. Cl.
  *B62D 27/02* (2006.01)
  *B62D 29/00* (2006.01)
  *B62D 65/02* (2006.01)
(58) Field of Classification Search
  USPC .................................................. 296/193.06
  See application file for complete search history.

(56) References Cited

U.S. PATENT DOCUMENTS

| | | | |
|---|---|---|---|
| 6,217,109 B1 | 4/2001 | Okana et al. | |
| 8,641,133 B1* | 2/2014 | Scaringe | B62D 29/008 296/193.03 |
| 2002/0167197 A1 | 11/2002 | Freitag et al. | |
| 2004/0201253 A1* | 10/2004 | Kitagawa | B62D 21/15 296/187.03 |
| 2005/0023862 A1* | 2/2005 | Saeki | B60J 5/0429 296/187.12 |
| 2007/0063546 A1* | 3/2007 | Lassl | B62D 25/04 296/193.06 |
| 2007/0102964 A1 | 5/2007 | Yoshimoto et al. | |
| 2008/0088157 A1 | 4/2008 | Chen et al. | |
| 2008/0106123 A1* | 5/2008 | Lakic | B62D 25/04 296/205 |
| 2008/0143147 A1* | 6/2008 | Lee | B62D 25/04 296/193.06 |
| 2008/0211264 A1 | 9/2008 | Riess et al. | |
| 2010/0084892 A1* | 4/2010 | Yoshida | B21D 7/08 296/203.02 |
| 2010/0194147 A1* | 8/2010 | Aul | B62D 25/04 296/193.06 |
| 2012/0153680 A1* | 6/2012 | May | B60R 22/24 296/203.03 |
| 2012/0261950 A1 | 10/2012 | Balzer et al. | |
| 2012/0313400 A1* | 12/2012 | Balzer | B62D 25/04 296/193.06 |
| 2013/0020834 A1* | 1/2013 | Diersmann | B21D 26/033 296/193.06 |
| 2013/0140851 A1 | 6/2013 | Zoernack et al. | |
| 2016/0229457 A1* | 8/2016 | Boettcher | B62D 25/04 |
| 2016/0236715 A1* | 8/2016 | Kurokawa | B62D 25/2045 |
| 2017/0036701 A1* | 2/2017 | Yamada | B62D 21/157 |
| 2017/0327153 A1* | 11/2017 | Kim | B62D 25/04 |
| 2017/0327154 A1* | 11/2017 | Harrison | B62D 25/04 |
| 2017/0327157 A1* | 11/2017 | Jaunasse | B29C 43/18 |
| 2018/0029648 A1* | 2/2018 | Von Watzdorf | B62D 25/04 |
| 2019/0248420 A1* | 8/2019 | Caliskan | B62D 25/04 |

FOREIGN PATENT DOCUMENTS

| | | |
|---|---|---|
| DE | 10 16 730 A1 | 11/1991 |
| DE | 40 16 730 A1 | 11/1991 |
| DE | 196 03 098 A1 | 7/1997 |
| DE | 697 07 066 T2 | 7/2002 |
| DE | 101 17 009 A1 | 10/2002 |
| DE | 102 32 320 A1 | 2/2004 |
| DE | 600 06 010 T2 | 11/2004 |
| DE | 10 2005 038 488 A1 | 2/2007 |
| DE | 10 2006 051 991 A1 | 5/2007 |
| DE | 10 2008 024 274 A1 | 11/2009 |
| DE | 10 2010 036 450 A1 | 1/2012 |
| DE | 10 2012 205 882 A1 | 10/2012 |
| EP | 1 382 513 A2 | 1/2004 |
| EP | 2 143 621 A1 | 1/2010 |

OTHER PUBLICATIONS

German-language Written Opinion (PCT/ISA/237) issued in PCT Application No. PCT/EP2016/056665 dated Jun. 24, 2016 (Seven (7) pages).

German-language Search Report issued in counterpart German Application No. 10 2015 205 402.0 dated Nov. 25, 2015 with partial English translation (Ten (10) pages).

Chinese-language Office Action issued in counterpart Chinese Application No. 201680004186.5 dated Aug. 22, 2018 with English translation (14 pages).

* cited by examiner

BODY STRUCTURE HAVING B-PILLAR REINFORCEMENTS FORMED INTEGRALLY AND AS CURVED TUBES, AND CORRESPONDINGLY FORMED B-PILLAR REINFORCEMENT

CROSS REFERENCE TO RELATED APPLICATIONS

This application is a continuation of PCT International Application No. PCT/EP2016/056665, filed Mar. 24, 2016, which claims priority under 35 U.S.C. § 119 from German Patent Application No. 10 2015 205 402.0, filed Mar. 25, 2015, the entire disclosures of which are herein expressly incorporated by reference.

BACKGROUND AND SUMMARY OF THE INVENTION

The invention relates to a passenger car body structure having B-pillar reinforcements formed as hollow steel profiles which each have an upper attachment portion for attachment to a roof region and a lower attachment portion for attachment to a floor assembly or a side sill.

The invention further relates to a B-pillar reinforcement or a central pillar reinforcement for a passenger car motor vehicle body or passenger car body structure.

Motor vehicle bodies of passenger cars should be stable and ensure optimum protection for the occupants. With regard, inter alia, to side crash effects, the body structures of modern passenger car motor vehicle bodies are equipped in the side region with what are referred to as pillar reinforcements. In order to reinforce vehicle bodies or body structures in the region of their B-pillars or central pillars, various measures are known from the prior art.

A measure which is widespread in the prior art is the use of hot-formed or press-hardened shaped sheet metal parts, as described, for example, in DE 697 07 066 T2 and DE 10 2005 038 488 A1.

Another measure known from the prior art is the use of hollow profiles, as described, for example, in DE 10 2010 036 450 A1, DE 10 2008 024 274 A1 and DE 600 06 010 T2.

The object on which the invention is based is to provide an improved passenger car body structure of the type stated at the outset which can, in particular, also be produced simply and cost-effectively.

This and other objects are achieved by a body structure, as well as a tubular B-pillar reinforcement, according to embodiments of the invention.

The passenger car body structure according to the invention has B-pillar or central pillar reinforcements which are formed as hollow steel profiles and which are each designed with an upper attachment portion for attachment to the roof region of the body structure and a lower attachment portion for attachment to the floor assembly or a side sill of the body structure, with the result that these B-pillar reinforcements extend over the entire body height at their installation sites on the right and the left body side. According to the invention, provision is now made for these B-pillar reinforcements to be formed as one-piece tubes (or as tubular hollow profiles) of a high-strength steel material, wherein these tubes have a curved course with a constant radius of curvature or arc radius between their lower attachment portions and their upper attachment portions.

With particular preference, the tubes are formed over their entire axial course with a constant radius of curvature and thus have a curved course of constant radius. A tube is generally understood to mean an elongate hollow body which has, in particular, a single cross-sectionally closed cavity. A wide variety of cross-sectional shapes is possible, with round cross sections, in particular oval or circular cross sections, being preferred (so-called round tubes which can have a diameter of, for example, 30 mm to 70 mm). However, it is also possible to provide non-round or polygonal or more complex cross-sectional shapes, which can also have, for example, at least one concave portion. With particular preference, provision is made for the tubes to be formed over their longitudinal extent with uniform cross sections or with a constant cross section. A high-strength steel material is understood to mean a steel material which has an (ultimate) tensile strength of at least 1200 MPa and preferably of at least 1400 MPa.

An advantage of the invention can be seen in the fact that tubes which are formed from a high-strength steel material and have a curved course which is of constant radius or uniform can be produced in a comparatively favorable manner. (A preferred production method is explained in further detail hereinbelow.) A further advantage can be seen in the fact that identical tubes can be used for the right and the left body side. Furthermore, the tubes provided for example with a certain length can be tailored to different vehicle types by shortening.

Safety belt, door lock and door hinge fastenings and/or the like can be welded directly to the curved tubes. The stable tubes can thus at the same time also serve for the attachment of the relevant components and the associated introduction of force into the body structure.

The tubes can be incorporated into the body structure by way of upper and lower retaining elements, with it being possible for the tubes to be connected at their upper and lower attachment portions to these retaining elements in an integrally bonded manner (for example by welding or brazing) and/or in a form-fitting manner (for example, by use of correspondingly formed receptacles on the retaining elements). The retaining elements have connecting portions by which they can be fastened to the roof region or to the floor assembly or the side sills. The fastening can be achieved, for example, by welding, brazing, adhesive bonding, riveting and/or screwing. The retaining elements are preferably formed from metal and can be produced, for example, as cast parts, welded parts or formed parts. However, the retaining elements can also be formed from composite materials, for example CRP or GRP, in particular with metallic inlays. The retaining elements are preferably formed in such a way that they are pressure- or compression-loaded in the event of a side crash.

The body structure can be what is referred to as a lightweight structure which has numerous aluminum and/or fiber composite components. At least the roof region or the longitudinal roof members, the floor assembly and/or the side sills are preferably formed from a fiber composite material, in particular CRP or GRP. Particularly in this case, provision is made for the retaining elements to be adhesively bonded to these components formed from fiber composite material. Alternatively, a screwed connection and/or riveted connection can also be provided, for example.

The B-pillar or central pillar reinforcement according to the invention is characterized, analogously to the preceding explanations, in that it is formed as a one-piece tube of a high-strength steel material, wherein this tube has a curved course with a constant radius of curvature between its lower attachment portion or its lower end and its upper attachment portion or its upper end.

The tube is preferably a roll-profiled and laser-seam-welded tube. Roll-profiling is a continuous forming process in which a tube string is successively formed (endless manufacture) in a roll-profiling plant from a fed-in sheet metal strip (which is typically unwound from a coil) in a plurality of forming steps using rotating forming tools (these are pairs of rolls as a rule). The forming operation generally takes place cold and without active influencing of the structure. The edges of the sheet metal which abut as a result of the forming operation are laser-welded (or, where appropriate, even only laser-brazed) to one another with the formation of a longitudinal laser seam. Laser welding (or, where appropriate, laser brazing) preferably also takes place within the roll-profiling plant. Even the production of the curved shape can also take place within the roll-profiling plant. The tube string continuously produced in this way merely still requires to be cut to length on exiting the roll-profiling plant. The tubes produced piecewise have final geometries, that is to say further forming steps are not provided.

An advantage of roll-profiling can be seen in the fact that a high-strength sheet steel material (for example with at least 1200 MPa and preferably with at least 1400 MPa) can be already used as starting material. The high-strength sheet steel material has, for example, a homogeneous sheet thickness of 2 mm to 4 mm. (In principle, sheet metal strips having a non-homogeneous sheet thickness can also be used.) While maintaining the sheet thickness, the tube serving as pillar or central pillar reinforcement can thus have a substantially homogeneous wall thickness of 2 mm to 4 mm. Considerable energy, environmental and cost advantages are obtained to some extent by comparison with hot-forming or press-hardening. Furthermore, the roll-profiled tubes can have a better structure quality and/or surface quality.

The B-pillar reinforcement according to the invention can have welded-on or brazed-on safety belt, door lock and door hinge fastenings or the like. Furthermore, the B-pillar reinforcement can be connected at its upper end to an upper retaining element and at its lower end to a lower retaining element (for incorporation into a passenger car body structure). The B-pillar reinforcement according to the invention can also have a coating, for example a cathodic electrodeposition coating, or at least a corrosion protection coating, for example a zinc coating (galvanization) or aluminum coating. The coating preferably also covers any safety belt, door lock and/or door hinge fastenings. Provision is particularly preferably made for the coating or corrosion protection coating to have already been applied to the starting material (sheet steel material) used for roll-profiling. A correspondingly formed B-pillar reinforcement can be provided as a prefabricated part and incorporated or inserted into a body structure.

Other objects, advantages and novel features of the present invention will become apparent from the following detailed description of one or more preferred embodiments when considered in conjunction with the accompanying drawings.

BRIEF DESCRIPTION OF THE DRAWINGS

The features shown in the figures and/or explained hereinbelow can also develop the invention individually (i.e. independently of combinations of features which are shown and/or explained).

DETAILED DESCRIPTION OF THE DRAWINGS

Figure 1:
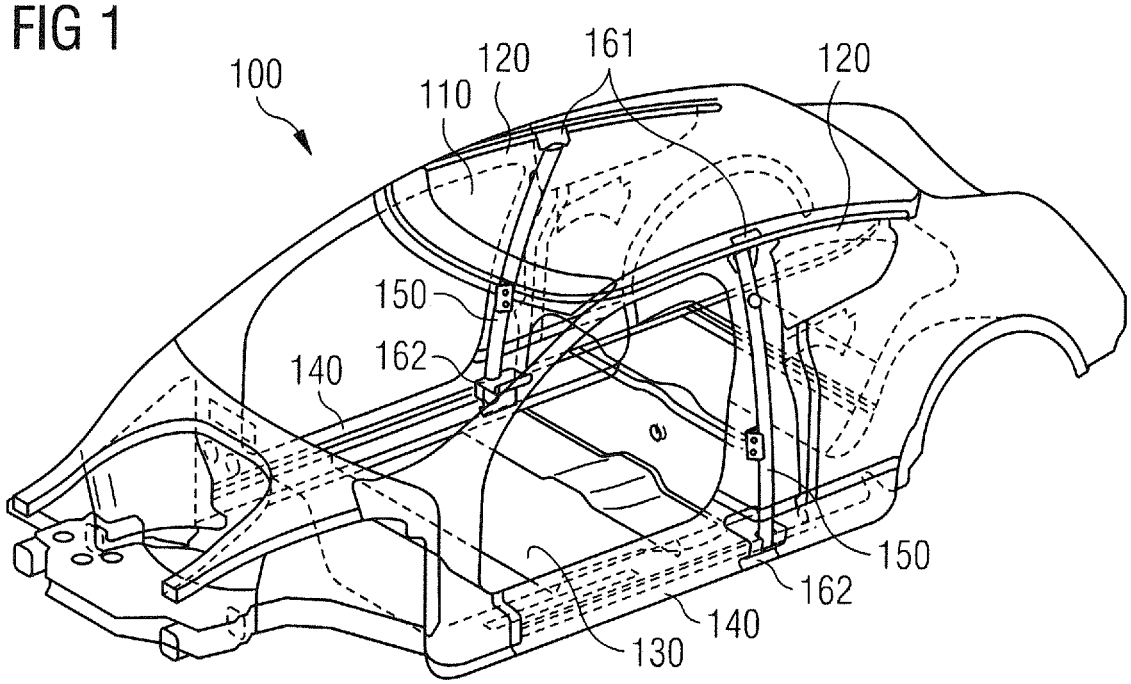
FIG. 1 is a perspective view of a passenger car body structure according to an embodiment of the invention.

FIG. 1 shows a passenger car body structure 100 with a roof region 110 and a floor assembly 130. The body structure 100 further has two longitudinal roof members 120 and two side sills 140. At least the longitudinal roof members 120 and/or the side sills 140 can also be formed from a fiber composite material, for example CRP or GRP.

Central pillars or B-pillars, which are equipped with pillar reinforcements 150, are present in the central region of the body structure 100 on both body sides. According to the invention, these central pillar or B-pillar reinforcements 150 are formed as one-piece tubes of a high-strength steel material, the tubes having a curved course with a constant radius of curvature R (see FIG. 2). The tubes are preferably roll-profiled and laser-seam-welded tubes which are produced in one piece (i.e. not from a plurality of joined-together pieces).

The pillar reinforcements 150 formed as tubes are attached by their upper ends to the longitudinal roof members 120 and by their lower ends to the side sills 140. The attachment is obtained indirectly by means of upper retaining elements 161 and lower retaining elements 162. The retaining elements 161 and 162 are formed in such a way that they are pressure-loaded in the event of a side crash, this also being taken into consideration in the overall fastening construction for the B-pillar reinforcements 150. The retaining elements 161 and 162 can also be referred to as pillar feet.

Figure 2:
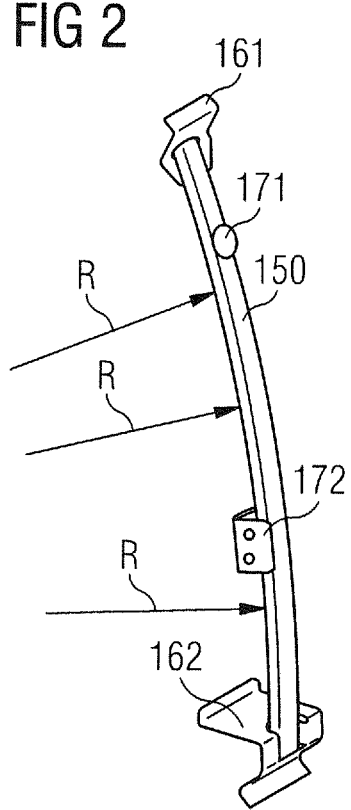
FIG. 2 is a perspective view of a central or B-pillar reinforcement according to an embodiment of the invention.

FIG. 2 is an enlarged detail illustration showing a B-pillar reinforcement 150 together with an upper retaining element 161 and a lower retaining element 162. The retaining elements 161 and 162 are formed by way of example as shaped sheet metal parts. At its upper end or its upper attachment portion, the tube 150 is welded or brazed (where appropriate, even adhesively bonded) to the upper retaining element 161. At its lower end or its lower attachment portion, the tube 150 is received in a form-fitting manner in a clip-shaped receptacle of the lower retaining element 162 and additionally welded or brazed (where appropriate, even adhesively bonded). Furthermore, a safety belt fastening 171 and a door lock fastening 172 are welded or brazed to the tube 150.

The B-pillar reinforcement 150 can be prepared as shown in FIG. 2 and be incorporated into the body structure 100. The connection to the retaining elements 161 and 162 can take place during installation into the body structure 100 or already before the installation. The installation takes place in such a way that the inner side of the arc of curvature points or is directed into the vehicle interior. The retaining elements 161 and 162 have relatively large-area connecting portions by which a planar and even positive connection to the longitudinal roof member 120 or side sill 140 can be produced. In the event of a side crash, the large-area contact region also allows for a very good introduction of force into the longitudinal roof member 120 or side sill 140. Fastening to the longitudinal roof member 120 or side sill 140 can be achieved, for example, by adhesive bonding, welding, brazing, screwing, riveting or the like.

As can be seen very clearly from FIG. 2, the tube 150 serving as pillar reinforcement has a curved course with a constant radius of curvature or arc radius R. Furthermore, the tube 150 is formed over its longitudinal extent with a uniform or constant round cross section, with other, and in particular non-round, cross-sectional shapes also being possible.

LIST OF REFERENCE SIGNS

100 Body structure (passenger car)
110 Roof region
120 Longitudinal roof member
130 Floor region
140 Side sill
150 B-pillar reinforcement, central pillar reinforcement
161 Upper retaining element
162 Lower retaining element
171 Safety belt fastening
172 Door lock fastening
R Radius of curvature, arc radius The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A body structure for a passenger car, comprising:
B-pillar reinforcements formed as hollow steel profiles, each having an upper attachment portion for attachment to a roof region of the body structure and a lower attachment portion for attachment to a floor assembly or a side sill of the body structure; and
upper and lower retaining elements configured to incorporate the B-pillar reinforcements into the body structure,
wherein
the B-pillar reinforcements are one-piece tubes made of a high-strength steel material,
the one-piece tubes have a curved course with a substantially constant radius of curvature between their lower attachment portions and their upper attachment portions, and
the upper and lower retaining elements are configured to receive pressure loads received by the B-pillar reinforcements during a side crash in compression and to transfer the pressure loads to the roof region and the floor assembly or the side sill.

2. The body structure as claimed in claim 1, wherein
one or more of a safety belt fastening, a door lock fastening, and a door hinge fastening are welded or brazed to the one-piece tubes.

3. The body structure as claimed in claim 1, wherein
the one-piece tubes are connected at their upper and lower attachment portions to the respective upper and lower retaining elements in an integrally bonded and/or form-fitting manner.

4. The body structure as claimed in claim 1, wherein
one or more of the following are formed of a fiber composite material:
longitudinal roof members of the roof region, the floor assembly and the side sills.

5. The body structure as claimed in claim 3, wherein
one or more of the following are formed of a fiber composite material:
longitudinal roof members of the roof region, the floor assembly and the side sills.

6. The body structure as claimed in claim 5, wherein
the upper and lower retaining elements are adhesively bonded to components formed of the fiber composite material.

7. A B-pillar reinforcement for a motor vehicle body, comprising:
a one-piece hollow tube of a high-strength steel material, the tube having an upper attachment portion for attachment to a roof region of the motor vehicle body and a lower attachment portion for attachment to a floor assembly or a side sill of the motor vehicle body; and
upper and lower retaining elements configured to incorporate the B-pillar reinforcements into the body structure,
wherein
the one-piece tube has a curved course with a constant radius of curvature between the lower attachment portion and the upper attachment portion, and
the upper and lower retaining elements are configured to receive pressure loads received by the B-pillar reinforcements during a side crash in compression and to transfer the pressure loads to the roof region and the floor assembly or the side sill.

8. The B-pillar reinforcement as claimed in claim 7, wherein
the one-piece tube is a roll-profiled and laser-seam-welded tube.

9. The B-pillar reinforcement as claimed in claim 7, further comprising:
one or more of a safety belt fastening, a door lock fastening or a door hinge fastening welded-on the one-piece tube.

10. The B-pillar reinforcement as claimed in claim 7, further comprising:
a coating provided on the one-piece tube.

* * * * *